June 14, 1960  C. R. RHODES  2,941,149
ELECTRICAL INSTRUMENT PROTECTORS
Filed Aug. 20, 1956

INVENTOR.
CHESTER R. RHODES
BY  Harry R. Lubcke
AGENT

United States Patent Office 2,941,149
Patented June 14, 1960

2,941,149
ELECTRICAL INSTRUMENT PROTECTORS
Chester R. Rhodes, Whittier, Calif., assignor to Electronic Specialty Co., Los Angeles, Calif., a corporation of California Filed Aug. 20, 1956, Ser. No. 605,162
3 Claims. (Cl. 324—110)

My invention relates to the art of electrical measurement and particularly to a shunt circuit for preventing damage to an instrument of the nature of a D'Arsonval movement under conditions of severe electrical overload without either temporarily or permanently breaking the electrical circuit involved.

The prior art has often sought to protect electrical measuring instruments from electrical overloads by sensitive and/or quick-acting fuse devices. These have the disadvantages of disabling the instrument as to a continuing indication and of requiring servicing by the installation of a new fuse before normal operation can be resumed.

In many applications, such as in all branches of aviation and military equipment where safety and preservation of life are important, a protector which enables an overloaded meter to indicate the overloaded condition of the circuit for extended periods of time and also to allow normal indications as soon as the overload is removed without servicing or other attention whatsoever is seen to be most valuable.

I provide such a protector by forming a barrier film having a very high resistance at the low voltages found across a meter movement but which presents quite low resistance at voltages somewhat in excess of normal voltages, the resistance decreasing rapidly with voltage above normal values.

I have found it possible to handle overloads as great as 1,000% without damage to either instrument or protector.

An object of my invention is to provide an electrical overload protector for electrical devices subject to destructive forces or temperatures upon overload.

Another object is to provide a protector that will not cause the indication of an electrical instrument to cease upon accomplishing protection.

Another object is to provide a protector which allows normal operation of the protected device to be restored as soon as the electrical overload is removed.

Another object is to provide a protector which does not need to be replaced or readjusted upon having furnished protection.

Another object is to provide a protector which is small, rugged and which does not have moving parts.

Another object is to provide a protector that is of simple construction.

Figure 1:
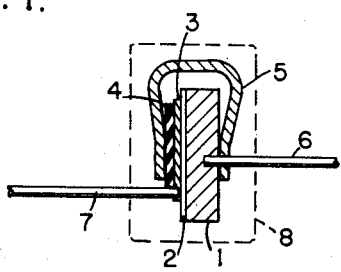
Figure 2:
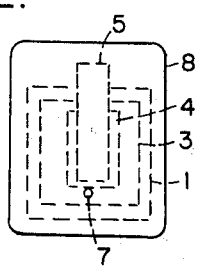
Figure 3:
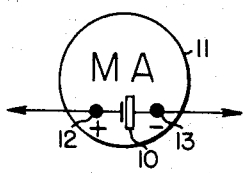
Figure 4:
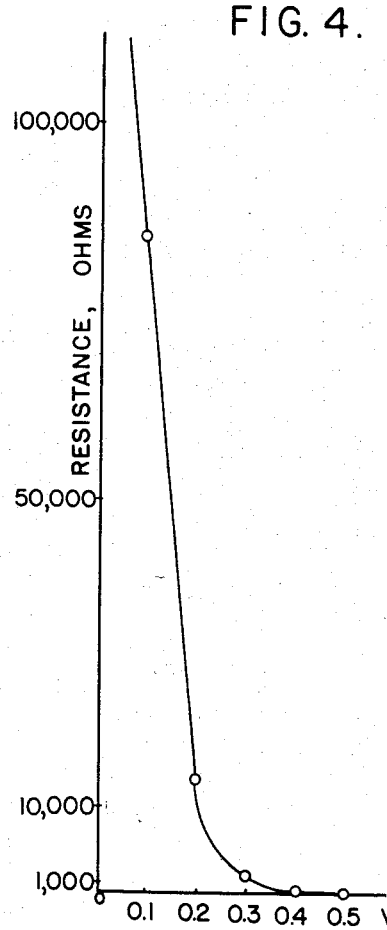
Figure 5:
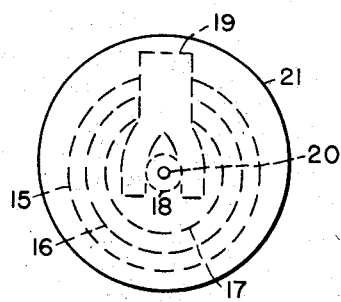
Figure 6:
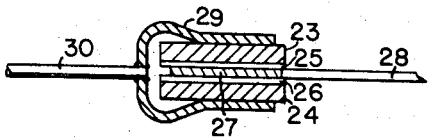

Other objects of my invention will become apparent upon reading the following detailed specification and upon examining the related drawings, in which:

Fig. 1 shows a sectional elevation view of my protector with encapsulation material shown in phantom, Fig. 2 shows an end elevation exterior view of the same, Fig. 3 shows how the protector is connected to an instrument, Fig. 4 shows the resistance vs. applied voltage curve of the film substance of the protector, Fig. 5 shows an alternate embodiment for higher currents in exterior end elevation, and Fig. 6 shows a second alternate embodiment of a double type protector in sectional elevation.

In Fig. 1, numeral 1 indicates the metal base electrode of the protector. This may be of copper and of the order of $\frac{1}{32}$ to $\frac{1}{16}$ inch in thickness. Fig. 1 is approximately four times actual size in order to show necessary detail. Upon base 1 is a very thin film of the chemical element selenium, 2. This is within the range of one ten-thousandth of an inch (0.0001″) to one thousandth of an inch (0.001″), but is shown thicker in Fig. 1 in order to be seen.

The selenium film is preferably deposited by vacuum evaporation. The element selenium is placed in a small crucible suitable for electric heating to incandescence in a vacuum. A relatively large sheet of copper base material is chemically cleaned and then placed above the crucible. The bell jar is put in place and the necessary good vacuum for vacuum evaporation attained. The crucible is then heated to a few hundred degrees centigrade, the vacuum evaporation temperature for selenium, and the required thin coating is obtained.

The individual base electrodes are then stamped out of the large sheet. I have found this procedure to be superior to evaporating selenium on one or on a group of individual bases. Without limiting my invention I prefer to punch out small squares of the order of one-fourth inch (¼″) for use with the usual run of microammeters and low range milliammeters.

A contact or second electrode of a common conductor such as copper, 3, is placed in contact with the selenium film on the side opposite the base as shown in Fig. 1. This is nominally of smaller size than the base 1, and may be considerably smaller; however, an area approaching that of the base reduces any tendency to heat upon overloads. A thin piece of electrically good insulation is placed upon the contact electrode. This may be a relatively high temperature melting resin or plastic, also mica, glass, ceramic or equivalent derivatives. Over this sandwich is fastened clip 5, which is made of a spring material such as steel, Phosphor bronze or so on, and prestressed so that electrode 3 is tightly held against the selenium film. The insulator 4, of course, is employed to prevent shorting the assembly by clip 5. Pigtail lead 6 is soldered or otherwise firmly fastened with good electrical contact to base 1, while pigtail 7 is similarly connected to contact 3. The pigtails are normally formed of solid copper wire and the portions away from the protector proper are tinned to allow easy soldering to the external circuit (i.e., across the instrument D'Arsonval movement or the equivalent).

At 8 in Fig. 1 there is a phantom (dotted) showing of the outline of an encapsulation. This is preferred in commercial manufacture in order to make the protector impervious to moisture and other unfavorable ambient conditions. This may be an epoxy, a resin or an equivalent encapsulating compound having an application and/or curing temperature below 380° C. At higher temperatures the selenium film is impaired.

The end view of the protector is shown in Fig. 2, the internal elements dotted and the encapsulating case in full lines.

Fig. 3 shows how the protector 10 is connected to the instrument 11 to be protected. Most instruments utilize the D'Arsonval direct current movement and the polarity of the protector and of the instrument is matched so that the former will conduct on overloads. This is attained when the base electrode is connected to the negative terminal of the instrument. The protector may be used for rectifier type alternating current meters. These have a D'Arsonval movement and the protector is placed across that only by making connection within the instrument.

In Fig. 3 the protector is indicated connected directly across the milliammeter terminals 12 and 13. A resistor in series with the meter movement is not required for protective reasons, nor is any other electrical impedance. Such a resistor or impedance would tend to make the instrument less ideally suited for the purpose intended or would alter the calibration.

For the area of selenium film shown in Figs. 1 and 2 the instrument protected is preferably a milliammeter of a very few milliamperes range or in the hundreds of microamperes range. The meter movements of the "all purpose" milliammeter-voltmeters are in this class, thus there are many such instruments in use and in a manner where accidental overload protection is very useful. With respect to any voltmeter, of course, the protector is placed across the D'Arsonval coil only; the voltmeter series resistance is not included in the shunted circuit.

The manner in which the protector operates is indicated by the curve of Fig. 4. This is a plot of the forward resistance of the protector vs. the fraction of a volt applied across it. The circles on the curve represent experimental data.

The resistance of the usual microammeter is of the order of a few thousand ohms and of a low range millammeter of the order of several hundred ohms. The voltage drop across such resistances at the full scale deflection of the meter involved is of the order of a few tenths of a volt. It is known that such instruments will stand an overload of perhaps twice normal scale reading without damage. The area and thickness of my selenium film is composed to have a very high resistance, such as 150,000 ohms for normal voltage drops across the instrument, such as 0.1 volt or less. Such a high shunting resistance does not affect the meter calibration. However, somewhat beyond full scale deflection the voltage drop reaches 0.3 volt, where measurements on my protector give a resistance of the order of 1,000 ohms and at 0.5 volt of only 78 ohms. It is thus seen that as the current rises to abnormal values the major portion thereof is carried by the protector and a safe portion by the meter.

In a practical test I connected a protected microammeter across a voltage source which gave 100 milliamperes through the combination of microammeter and protector and allowed this operation to continue for 24 hours. At the end of this time neither the meter nor the protector were in any way harmed.

As has been intimated previously, higher range milliammeters and similar devices can be protected by lower resistance protectors. Such a practical embodiment is illustrated in Fig. 5. The major electrical difference is that the working area of the selenium film is greater than in Fig. 2, being of the order of ⅜" diameter. The same result can also be attained by utilizing a thicker selenium film than was previously specified.

In Fig. 5, 15 represents the base electrode (1 in Fig. 1), 16 the second electrode or contact, while 17 is the insulator. The latter has in this alternate a raised portion 18 which prevents forked spring 19 from contacting the second pigtail connection 20 (to the contact). The encapsulation is outer covering 21.

A double type protector is illustrated in Fig. 6, which also might be characterized as a folded-over embodiment. Two base elements 23 and 24 are provided and are assembled so that the selenium layers 25 and 26 are near together. A single flat contact element 27 is in contact with both layers. An integral part of contact 27 is external lead 28. A simple clip 29 holds the "sandwich" of elements and surfaces tightly together. Soldered, or otherwise affixed wire lead 30 serves as the external connection to both base electrodes. It will be noted that insulators are not required. This gives the simple construction previously referred to. Encapsulation is not shown in Fig. 6. As has been mentioned this can be omitted, or a varnish used, as well as the encapsulation described.

It will be understood that other modifications in construction can be made without departing from the teaching of my invention. Rather than pigtails, small tabs of the material of electrodes 1 and 3 (Fig. 1) may provide the external connections. Two clamps 5 may be used, or the encapsulation process altered to allow initial pressure between the electrodes by temporary pieces arranged to press electrodes 1 and 3 together under pressure during encapsulation, with the pieces subsequently removed and the electrodes held together by the encapsulating substance. The holes which remain where the pieces are initially located are subsequently filled with further encapsulation. Alternately, the pieces may be of an insulating substance having a higher softening point than the encapsulating substance employed and after encapsulation the pieces are broken or cut off according to usual molding practice.

The electrode structure may also be given suitable protection by dipping in a relatively thick and tenacious varnish or equivalent which is available to the trade. It is desirable that the selenium be kept from light so that the resistance is substantially constant regardless of the photoelectric effect of this element.

A particular advantage of my invention lies in forming the selenium film with a resistance vs. voltage characteristic which directly suits the normal load vs. overload requirements of most electrical instruments without additional resistors or other electrical elements. I have found selenium to be well suited for this purpose. As formed in my process it is of the gray metallic form. Other substances are not preferred, but the protector film may be formed of germanium. Germanium will not, however, handle as heavy overloads as selenium.

Besides the typical meter movements mentioned my protector may be employed to protect bolometers and delicate elements of electrical bridge type arrangements.

Of course, larger overload capacity can be achieved by connecting two or more protectors in parallel across the instrument to be protected.

It is also possible to form my units of triangular or other shapes and to utilize cylindrical, semi-cylindrical or other curved shapes for the electrodes rather than the flat shape illustrated.

Other variations in size, shape, proportions and details of form and preparation may be taken without departing from the spirit of my invention and the scope of the appended claims.

Having thus fully described my invention in the manner in which it is to be practiced, I claim:

1. An electrical measuring apparatus comprising a meter to accept a limited amount of electrical energy at less than three-tenths volts and a single overload means, said means connected directly in shunt to said meter without affecting its calibration and having plural base electrodes connected to one side of said shunt connection, a substance having the electrical characteristics of selenium vacuum evaporated upon said base electrodes to a thickness of the order of three ten-thousandths inch, one contact, said contact and said base electrodes arranged to position said contact in electrical connection to said substance on said base electrodes, said contact connected to the other side of said shunt connection, and means to hold said base electrodes and said contact in electrical connection, said overload means adapted to accept the major portion of electrical energy in excess of the limited amount acceptable by said meter and essentially none within said limited amount.

2. An electrical measuring apparatus comprising an electrical measuring device requiring an operating voltage of a small fraction of a volt and a single protector, said protector electrically connected directly in shunt to said device and having a pair of large electrodes connected to one side of said shunt connection, said electrodes having a thin evaporated layer of a chemical element of the electrical characteristics of selenium upon one side thereof having a thickness of the order of one ten-thousandths inch and one electrical contact touching the side of said layer opposite each said electrodes, said contact connected to the other side of said shunt connection; said layer adapted to have a resistance high with respect to that of said device at normal operating voltages therefor, but to have a resistance low with respect to that of said device at larger abnormal voltages appearing across said device, to the end that the functioning of said device is not altered by said protector within the normal operating range of said device and is protected from abnormal amounts of electrical energy beyond said range.

3. An electrical measuring apparatus comprising an electromechanical meter movement having a resistance of the order of a few thousand ohms and requiring a voltage of constant polarity of less than two tenths of a volt for full scale deflection and only one overload protector, said protector electrically connected directly in shunt to said movement and having two metal base electrodes connected to one side of said shunt connection, said base electrodes having a vacuum evaporated layer of selenium of the order of one five-thousandths of an inch thick deposited thereon, and only one metal contact positioned between said layers electrically engaging the side of each of the selenium layers opposite to said base electrodes, said contact connected to the other side of said shunt connection, said selenium layers adapted to present a resistance in shunt to said movement of the order of a few hundred thousands of ohms at a voltage thereacross of less than two tenths of a volt during normal electrical inputs thereto but to present a resistance in shunt to said movement of the order of a few tens of ohms at a voltage thereacross of more than three tenths of a volt during periods of electrical overload, to the end that the indications of said meter movement are unaltered within the normal range thereof and said meter movement is protected from damage by electrical energy impressed upon the combination in excess of said normal range.

References Cited in the file of this patent

UNITED STATES PATENTS

| | | | |
|---|---|---|---|
| 1,745,690 | Pritchett | Feb. 4, | 1930 |
| 1,894,035 | Gill | Jan. 10, | 1933 |
| 1,932,067 | Duhme | Oct. 24, | 1933 |
| 2,284,423 | Hansell | May 26, | 1942 |
| 2,431,151 | Tellegen | Nov. 18, | 1947 |
| 2,554,979 | Doucot | May 29, | 1951 |
| 2,571,458 | Lawrence | Oct. 16, | 1951 |
| 2,584,800 | Grisdale | Feb. 5, | 1952 |
| 2,671,874 | Friedrichs | Mar. 9, | 1954 |
| 2,736,850 | Lidow | Feb. 28, | 1956 |
| 2,789,254 | Bodle | Apr. 16, | 1957 |
| 2,815,475 | Lighty | Dec. 3, | 1957 |